(12) United States Patent
Cheng et al.

(10) Patent No.: US 8,363,386 B2
(45) Date of Patent: Jan. 29, 2013

(54) ELECTRONIC DEVICE WITH INTERFACE SHIELDING COVER

(75) Inventors: Chuang-Lao Cheng, Shenzhen (CN); Feng Dai, Shenzhen (CN); Shou-Ji Liu, Shenzhen (CN); Te-Sheng Jan, Tu-Cheng (TW); Yu-Tao Chen, Tu-Cheng (TW); Chun-Che Yen, Tu-Cheng (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 113 days.

(21) Appl. No.: 13/118,479

(22) Filed: May 30, 2011

(65) Prior Publication Data

US 2012/0155051 A1    Jun. 21, 2012

(30) Foreign Application Priority Data

Dec. 16, 2010    (CN) .......................... 2010 1 0591560

(51) Int. Cl.
*H02B 1/00* (2006.01)
*G06F 1/16* (2006.01)
*H01R 13/44* (2006.01)

(52) U.S. Cl. .............. 361/600; 361/679.01; 361/679.21; 361/679.55; 439/135; 439/136; 439/142; 439/190

(58) Field of Classification Search .................. None
See application file for complete search history.

(56) References Cited

U.S. PATENT DOCUMENTS

| 5,574,625 | A * | 11/1996 | Ohgami et al. .......... 361/679.09 |
| 6,267,608 | B1 * | 7/2001 | Yagi .............................. 439/142 |
| 7,048,556 | B2 * | 5/2006 | Stanton et al. ................ 439/135 |
| 7,307,846 | B2 * | 12/2007 | Du ................................ 361/728 |
| 7,561,420 | B2 * | 7/2009 | Chueh et al. ............. 361/679.59 |
| 2005/0287852 | A1 * | 12/2005 | Sugawara et al. ............. 439/135 |
| 2006/0007647 | A1 * | 1/2006 | Peng ............................. 361/683 |
| 2009/0109635 | A1 * | 4/2009 | Chen et al. .................... 361/728 |
| 2009/0231790 | A1 * | 9/2009 | Chi ............................. 361/679.6 |
| 2011/0122556 | A1 * | 5/2011 | Cheng et al. ............. 361/679.01 |
| 2012/0108088 | A1 * | 5/2012 | Peng et al. .................... 439/135 |

* cited by examiner

*Primary Examiner* — Gregory Thompson
(74) *Attorney, Agent, or Firm* — Altis Law Group, Inc.

(57) ABSTRACT

An electronic device includes a main body and an interface shielding cover. A recess is defined in the main body by a vertical wall and a bottom. Two openings are defined in the rear cover between the vertical wall and the bottom wall, two stop walls adjacent to the openings include a first engaging side and a second engaging side. The interface shielding cover includes a pair of elastic arms rotatably connected to the rear cover. Each elastic arm includes a first protrusion and a second protrusion distinctly oriented from the first protrusion. The interface shielding cover is rotatable relative to the rear cover between a closed position where the first protrusion abuts against the first engaging side to retain the cover in the closed position, and an open position where the second protrusion abuts against the second engaging side to retain the cover in the open position.

6 Claims, 5 Drawing Sheets

ELECTRONIC DEVICE WITH INTERFACE SHIELDING COVER

BACKGROUND

1. Technical Field

The present disclosure relates to an electronic device with an interface shielding cover.

2. Description of the Related Art

Electronic devices such as computers and cell phones usually include a number of ports, such as USB ports. Commonly, a rubber strip matching with the USB port can be employed to cover the USB ports for dust proofing. However, the rubber strip is small and tends to get lost. With the added contaminates from the dust the connection between devices can be affected.

BRIEF DESCRIPTION OF THE DRAWINGS

The components in the drawings are not necessarily drawn to scale, the emphasis instead being placed upon clearly illustrating the principles of an electronic device with an interface shielding cover. Moreover, in the drawings, like reference numerals designate corresponding parts throughout the several views.

DETAILED DESCRIPTION

Figure 1:
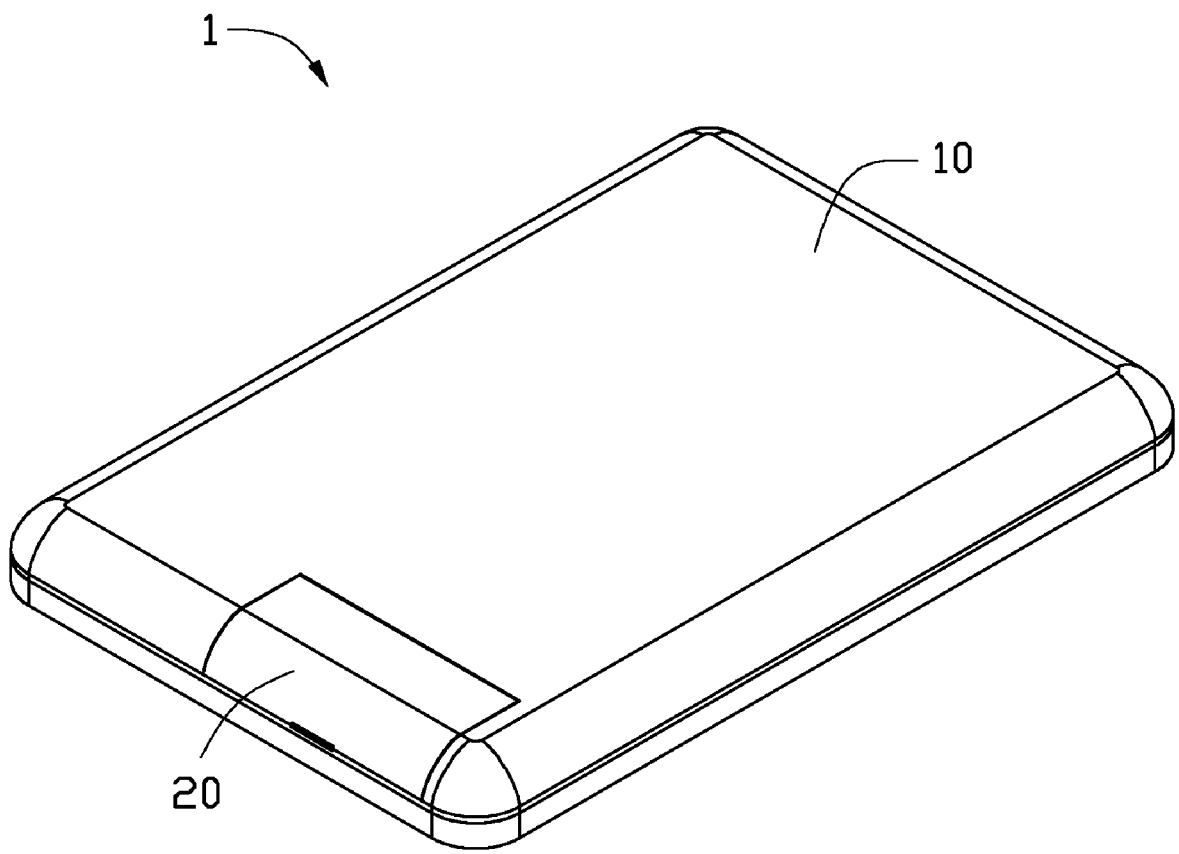
FIG. 1 is a schematic view of an electronic device in accordance with an exemplary embodiment.

Referring to FIG. 1, an electronic device 1 includes a main body 10 and an interface shielding cover 20 rotatably connected to the main body 10. The interface shielding cover 20 is used to shield ports, such as USB ports.

Figure 2:
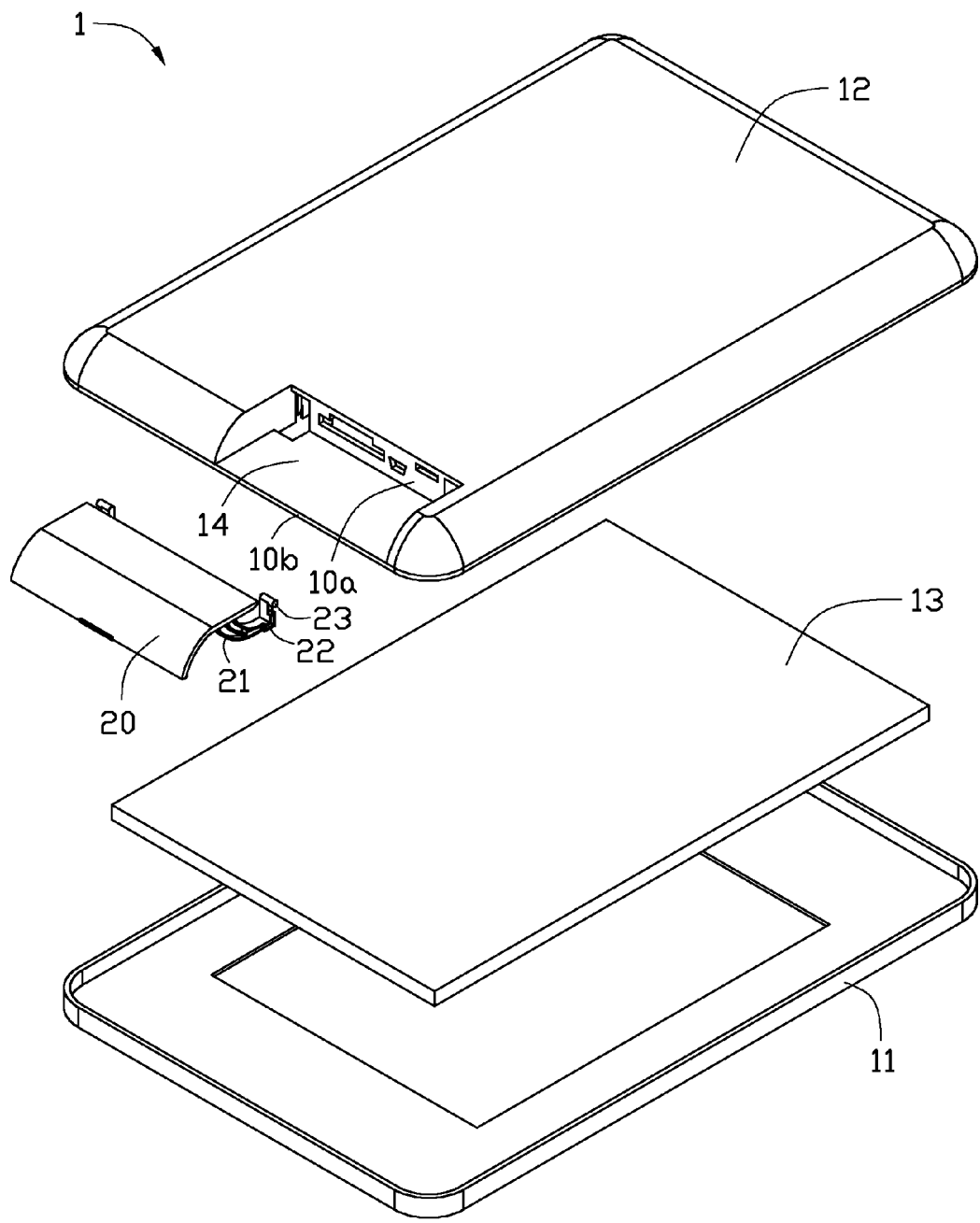
FIG. 2 is an isometric, exploded view of the electronic device in FIG. 1.
Figure 3:
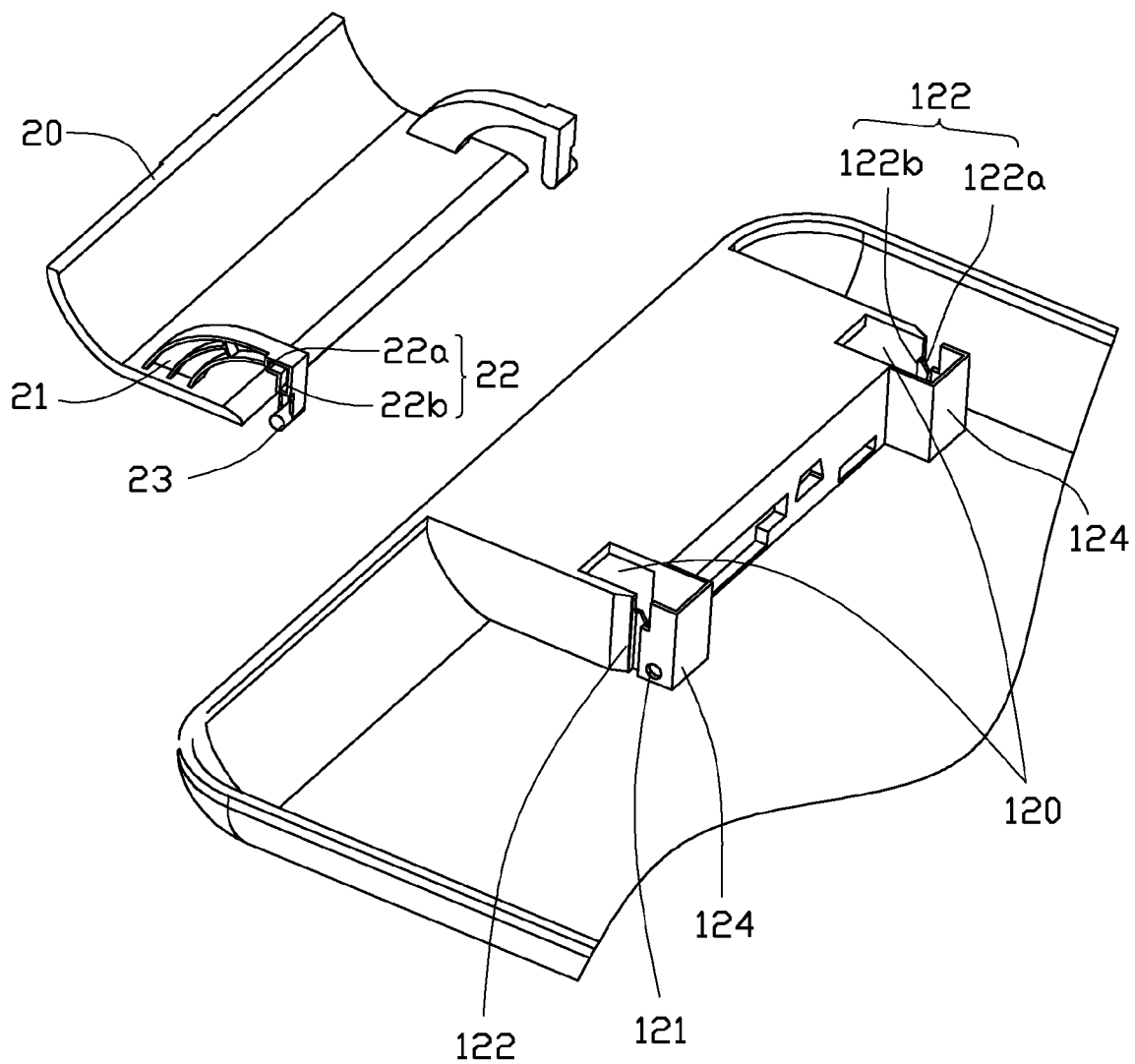
FIG. 3 is an exploded, partially enlarged isometric view of the electronic device in FIG. 1, but viewed from another aspect.
Figure 4:
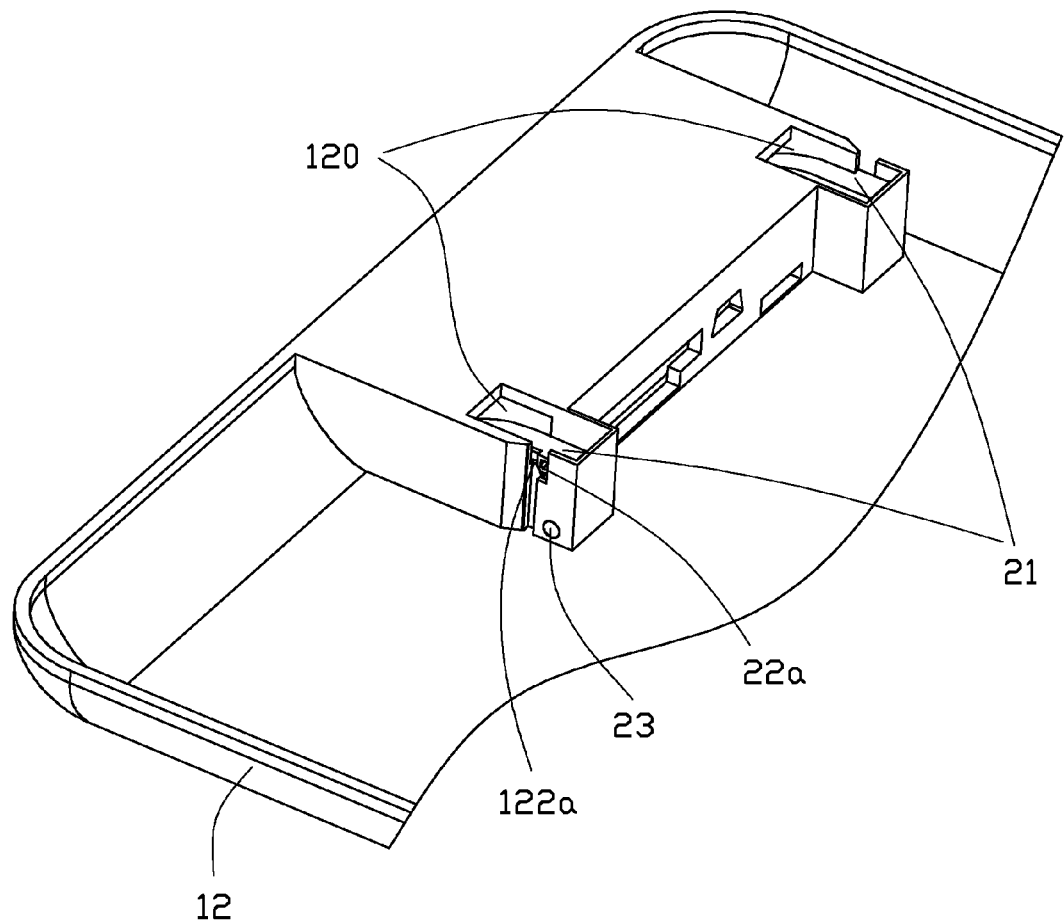
FIG. 4 is an assembled view of the electronic device in FIG. 3, in a closed position.

Referring to FIGS. 2, 3, and 4, the main body 10 includes a front cover 11, a rear cover 12 and a display panel 13. The display panel 13 is disposed in a space defined between the front cover 11 and the rear cover 12. The rear cover 12 includes a recess 14, a vertical wall 10a and a bottom 10b. The vertical wall 10a and the bottom 10b exposed in the recess 14. A plurality of interface ports, such as USB ports, is defined in the vertical wall 10a.

The interface shielding cover 20 shields the recess 14 by a cover portion (not labeled), and includes a pair of elastic arms 21, a pair of latching portions 22 extending from the distal free end of the each elastic arm 21, and a pair of cylindrical rods 23 protruding from the latching portions 22. Each of the latching portions 22 includes a first protrusion 22a and a second protrusion 22b distinctly oriented from the first protrusion 22a. In the embodiment, the first protrusion 22a and the second protrusion 22b are substantially perpendicular to each other. The cylindrical rod 23 is connected to the first protrusion 22a by a pair of walls. The elastic arms 21 are made of elastic material.

A pair of openings 120 are defined in the rear cover 12 at a joint portion between the vertical wall 10a and the bottom 10b. A pair of axle holes 121 is defined in two support walls 124 that protrude from the inner surface of the rear cover 12. The elastic arms 21 of the interface shielding cover 20 are respectively inserted into the openings 120, with the cylindrical rods 23 rotatably received in the axle holes 121. The interface shielding cover 20 thus can be rotated with respect to the rear cover 12.

A pair of stop walls 122 protrude from the inner surface of the rear cover 12 adjacent to the respective openings 120. Each of the stop walls 122 includes a first engaging side 122a and a second engaging side 122b. In the embodiment, the first engaging side 122a is adjacent to the openings 120, and the second engaging side 122b is inclined with respect to the first engaging side 122a. When the interface shielding cover 20 is in a closed position as shown in FIG. 4, the first protrusions 22a abut, respectively, against the first engaging sides 122a, thereby retaining the cover 20 in the closed position. To open the cover 20, a user needs to operate the free edge of the interface shielding cover 20 and push the interface shielding cover 20 upward to cause the elastic arms 21 to deform. The first protrusions 22a can then move over the first engaging sides 122a. The interface shielding cover 20 is then free from the limitation and can be opened.

Figure 5:
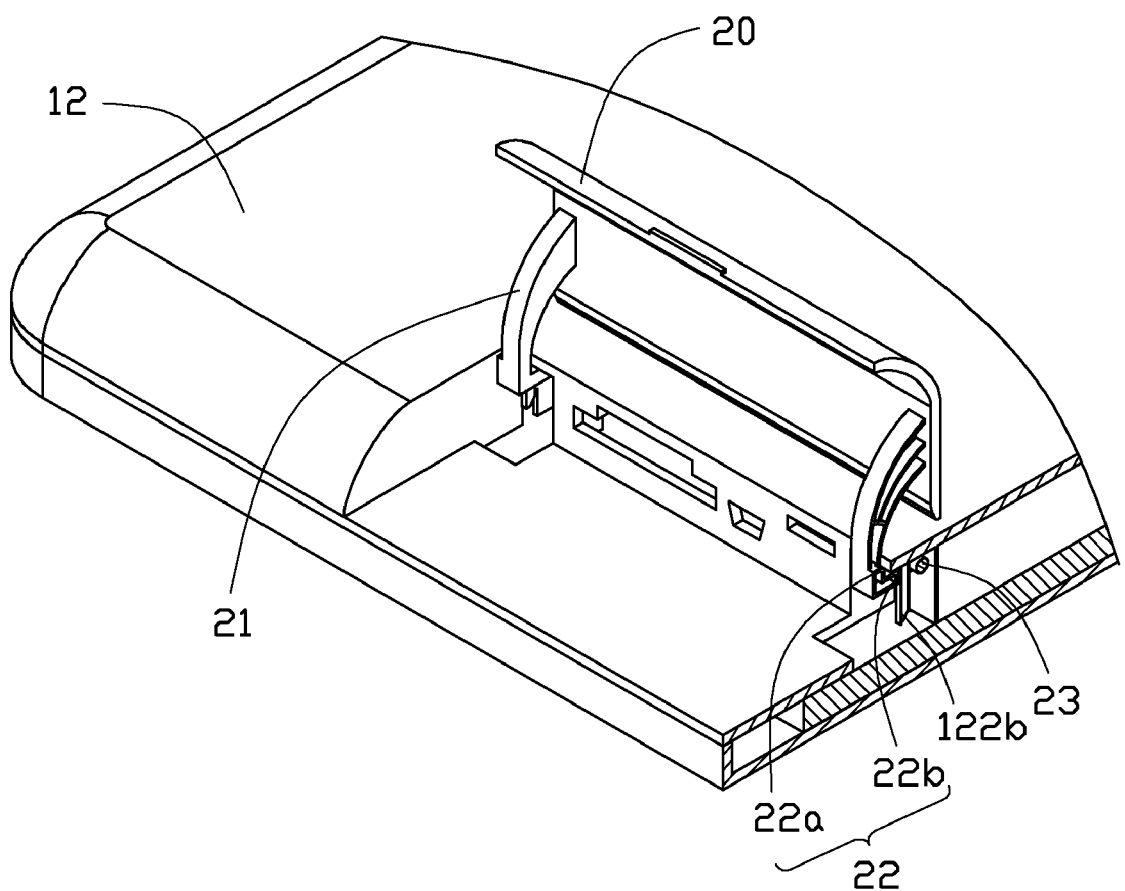
FIG. 5 is a cutaway view of the electronic device in FIG. 1, in an open position.

The interface shielding cover 20 is rotatable relative to the rear cover 14 about a rotation axis between a closed position and an open position. When the interface shielding cover 20 is in an open position as shown in FIG. 5, the second protrusions 22b of the elastic arms 21 abut, respectively, against the second engaging sides 122b of the stop walls 122, thereby retaining the interface shielding cover 20 in the open position. To close the cover 20, a user needs to operate the free edge of the interface shielding cover 20 and pushes the interface shielding cover 20 toward the main body 10 to cause the elastic arms 21 to deform, until the second protrusions 22b of the elastic arm 21 disengage from the second engaging sides 122b of the stop walls 122. The cover 20 is then free from the limitation and can be closed. In the embodiment, the body of the interface shielding cover 20 in the closed position is oriented 90 degrees relative to that in the open position.

It is understood that the present disclosure may be embodied in other forms without departing from the spirit thereof. Thus, the present examples and embodiments are to be considered in all respects as illustrative and not restrictive, and the disclosure is not to be limited to the details given herein.

What is claimed is:

1. An electronic device comprising:
   a main body comprising a front cover, a rear cover and a display panel sandwiched between the front cover and the rear cover, the rear cover comprising a recess, a vertical wall and a bottom, the vertical wall and the bottom exposed in the recess, the vertical wall defining an interface port, two openings being defined in the rear cover at a joint portion between the vertical wall and the bottom, the rear cover comprising two stop walls adjacent to the respective openings, each stop wall comprising a first engaging side and a second engaging side; and
   an interface shielding cover comprising:
      a pair of elastic arms extending from a cover portion of the interface shielding cover and being rotatably connected to the rear cover, each elastic arm comprising a first protrusion and a second protrusion distinctly oriented from the first protrusion;
   wherein the interface shielding cover is rotatable relative to the rear cover between a closed position where the first protrusion abuts against the first engaging side to retain the cover in the closed position, and an open position where the second protrusion abuts against the second engaging side to retain the cover in the open position.

2. The electronic device as recited in claim 1, wherein the first protrusion and the second protrusion are substantially perpendicular to each other.

3. The electronic device as recited in claim 1, wherein the cover in the closed position is oriented 90 degrees relative to that in the open position.

4. The electronic device as recited in claim 1, wherein the interface shielding cover further comprising:
   a pair of latching portions extending from the distal free end of the each elastic arm; and
   a pair of cylindrical rods protruding from the latching portions, each of the cylindrical rods is connected to the first protrusion.

5. The electronic device as recited in claim 4, wherein further comprising:
   a pair of axle holes defined in two support walls that protrude from the bottom of the recess; wherein the elastic arms are respectively received in the respective openings, with the cylindrical rods rotatably inserted into the axle holes.

6. The electronic device as recited in claim 1, wherein the first engaging side is inclined with respect to the second engaging side.

* * * * *